United States Patent [19]

Lundquist

[11] Patent Number: 4,647,275
[45] Date of Patent: Mar. 3, 1987

[54] RUNNER SHEARING ASSEMBLY FOR PLASTIC INJECTION MOLDING DIES

[76] Inventor: Lynn Lundquist, 10833 NE. Russell St., Portland, Oreg. 97220

[21] Appl. No.: 654,732

[22] Filed: Sep. 27, 1984

[51] Int. Cl.[4] .............................................. B29C 45/38
[52] U.S. Cl. .................................... 425/553; 264/161; 264/163; 264/328.7; 425/554
[58] Field of Search ............... 425/542, 553, 554, 556; 264/328.1, 328.8, 328.9, 161, 163

[56] References Cited

U.S. PATENT DOCUMENTS

| Re. 28,158 | 9/1974 | Uhlig. | |
|---|---|---|---|
| 3,362,046 | 1/1968 | Blummer. | |
| 3,672,807 | 6/1972 | Genz | 425/556 |
| 3,776,676 | 12/1973 | Kessler. | |
| 3,778,211 | 12/1973 | Moen et al. | |
| 3,936,261 | 2/1976 | Jones et al. | 425/556 |

FOREIGN PATENT DOCUMENTS

| 69167 | 1/1979 | Japan | 425/553 |
|---|---|---|---|
| 148533 | 11/1981 | Japan | 425/553 |

Primary Examiner—Jay H. Woo
Assistant Examiner—Timothy W. Heitbrink
Attorney, Agent, or Firm—Glen A. Collett

[57] ABSTRACT

A runner shearing apparatus which is mounted in the ejection half of a plastic injection molding die for the purpose of separating the part and the runner during the ejection cycle. A sleeve is mounted in the die so that a hole drilled in the upper lip of the sleeve becomes the runner gate. An ejector pin is mounted in the sleeve so that during the ejection of the finished part the gate area is sheared, and the runner falls separate from the part.

20 Claims, 4 Drawing Figures

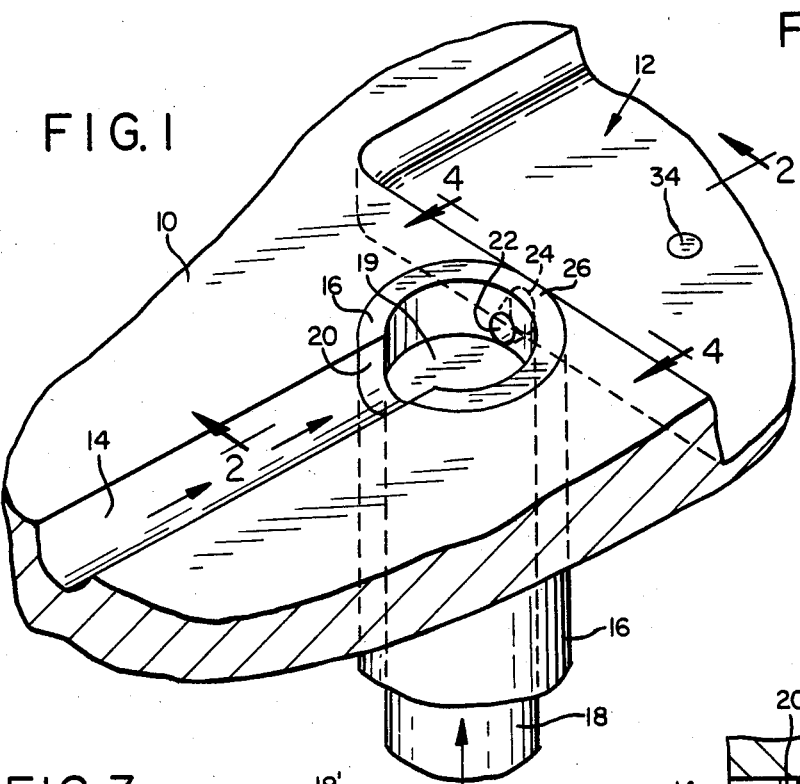
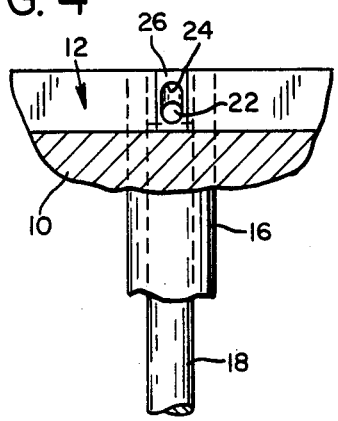
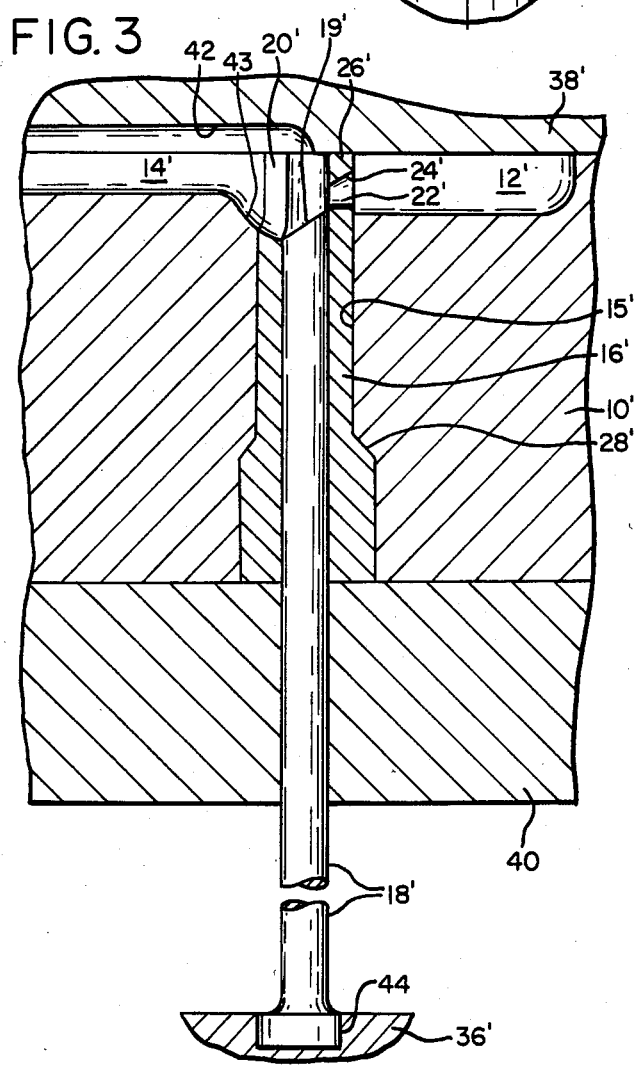
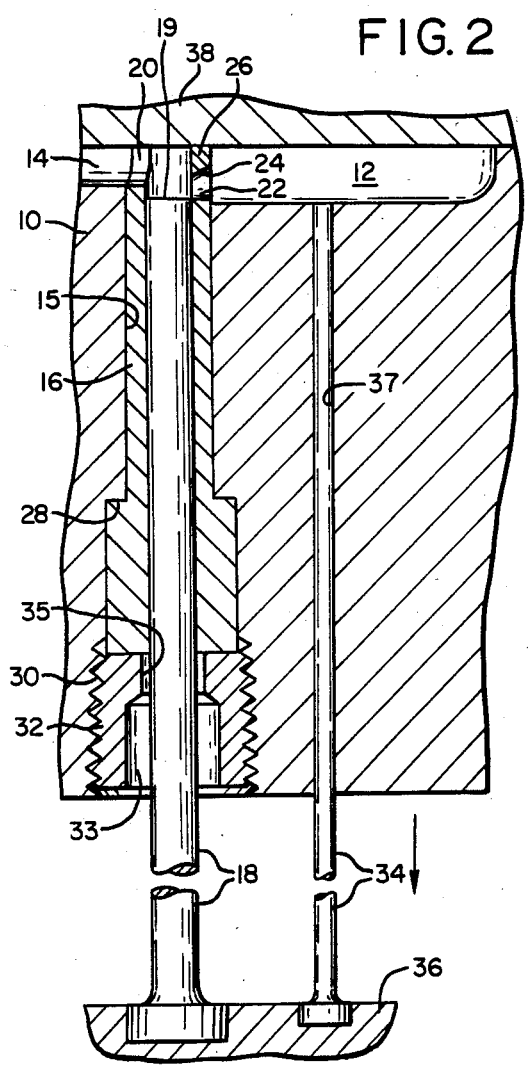

RUNNER SHEARING ASSEMBLY FOR PLASTIC INJECTION MOLDING DIES

BACKGROUND OF THE INVENTION

This invention pertains to plastic injection molding equipment, and more particularly to an apparatus for separating the runner from the plastic part during the operation of the molding dies.

During the injection molding of thermoformed plastic parts, some means is always used to convey the plastic from the source of molten plastic, that is the machine nozzle, to the cavity for forming the finished part. This takes place within the die. Although some systems have been developed which completely eliminate the need for a runner channel, many dies use such a channel formed in the face of the die for conveying the plastic to the cavity.

Generally speaking, die design is simpler with a runner system. However, the runner, which is the residual plastic remaining in the machined runner channels, is ejected along with the part and must be separated therefrom for the operation to be complete. This often involves a secondary trimming operation.

Two systems have previously been developed for automatically removing the runner during the ejection, or opening cycle, of the molding dies. In one case, the die is built with a third, movable plate. The plate is machined with the runner on one side and the part on the other. Thus, the die opens and the runner is ejected, breaking it from the part, whereupon the other side of the die opens and the part is ejected. Though effective, this system has the disadvantage of being a costly die to build and is noisy in operation.

The second previously known die design which separates the runner from the part during ejection is, however, a simple two plate die. In this case, the runner is modified so that the area immediately adjacent to the cavity, known as the gate, does not enter between the two die plates, but is angled in such a way that it enters through a drilling in the side wall of the part. This is known as a sub-gate. Since the runner end which enters the cavity is encircled by the cavity wall even when the die is open, that area of the runner is broken when the part and runner are ejected. While this system affords many advantages, it has one significant limitation, however. It cannot be used on a thin part nor one in which the length-to-height ratio is too great. This is because the mold base is made of a material which cannot support the repeated stress if the sub-gate is too close to the surface. Further, the sub-gate must necessarily be small to be the weakest area to break on ejection. Thus, the part cannot be packed with mold pressure since the gate area hardens quickly.

Accordingly, it is the general object of the present invention to provide a runner shearing assembly which automatically shears the runner from the part when the parts are ejected from the mold.

Another object of the present invention is to provide such a shearing assembly made of few, simple parts which are easy to install.

Yet another object is to provide a shearing assembly which can work with a very thin part.

Still another object is to provide a shearing assembly which can shear a much larger gate.

A further object is to provide a shearing system which can be retrofit into existing dies, including aluminum and soft steel molds.

A still further object is to provide a shearing assembly which can quickly be replaced if damaged.

These and other objects and advantages, and the manner in which they are achieved will be made apparent as the specification and claims proceed.

SUMMARY OF THE INVENTION

In its basic concept, the present invention is a runner shearing assembly for injection molding dies, wherein the dies include two base members facing each other and providing a cavity and a runner system therebetween, the runner shearing assembly including a cylindrical sleeve mounting a gate blade adjacent or over the gate, and a shearing pin mounted in the ejection half of the base members adjacent the gate blade and operable to scissor against the gate blade to shear off the plastic at the gate as the runner and the part are ejected from the mold.

BRIEF DESCRIPTION OF THE DRAWINGS

FIG. 1 is a top perspective view of a fragmentary portion of the ejection half of the molding dies, illustrating the runner and the cavity and the first embodiment of the shearing assembly of the present invention, showing only a fragmentary portion of the top end thereof.

FIG. 2 is a section taken along the line 2—2 of FIG. 1.

FIG. 3 is a section similar to the section of FIG. 2, illustrating a second embodiment of the present invention.

FIG. 4 is a fragmentary section taken along the line 4—4 of FIG. 1.

DESCRIPTION OF THE PREFERRED EMBODIMENTS

The first embodiment of the runner shearing assembly of the present invention is illustrated in FIGS. 1, 2 and 4. The assembly is mounted in a mold base of a plastic injection molding die. The die includes first and second base members 10 and 38, respectively, facing each other, and having a closed position in which they provide a cavity 12 therebetween. A runner channel 14 is also provided between the base members for conveying molten plastic from a plastic source, such as the nozzle (not shown) of a molding machine. FIG. 1 illustrates the ejection of the dies. In other words, when the mold is opened, the solidified part and runner are initially held on the ejection half of the dies until they are ejected from the die.

A hollow cylindrical shearing sleeve 16 is mounted in a stepped hole 15 in the mold base. The top end thereof is located so that the wall of the sleeve is adjacent the cavity. (Herein the words 'top', 'upper', 'below', etc. are directional words referring to the drawings. In practice, the assembly may be mounted in any orientation.) In fact, a small portion of the sleeve is actually a part of the cavity wall, as best shown in FIG. 4. The end of the sleeve is flush with the top of the base member.

A shearing pin 18 is mounted longitudinally slidably in the first base member 10 within sleeve 16. The pin has a top surface denoted at 19. The shearing pin may actually be an ejection pin, common in the diemaking industry.

One side of the end of the sleeve is cut away in the general shape of runner channel 14. Thus the sleeve has an opening therein communicating with the runner channel so that the molten plastic may pass into the end of the sleeve and fill the end thereof up to the top surface 19 of the shearing pin 18.

The other side of the top wall of the sleeve 16 includes a gate hole 22 for communicating between the interior of the end of the sleeve and cavity 12. The top portion of the gate hole is beveled at 24. This leaves a gate blade 26 above the gate hole, having a shearing edge adjacent the path of pin 18. As the pin is positioned, gate hole 22 is fully open. However, any upward movement of the pin results in a scissoring of the plastic in the gate.

As best shown in FIG. 2, sleeve 16 has a shoulder thereon at 28 and is mounted in a similarly configured stepped hole 15, thus exactly fixing its position both longitudinally and rotationally. The hole in the first base member is threaded at 30 at its outer end and the sleeve is secured is position by a hollow set screw 32 screwed against the end of the sleeve. The set screw includes a hex hole 33 for an Allen wrench, and another hole 35 through which shearing pin 18 extends.

As common in plastic injection molds, there are provided one or more ejection pins 34 which each slide longitudinally in a bore 37 for ejecting the solidified plastic part and the runner. Preferably, there is an ejection pin mounted fairly closely to the gate area. Also, beyond simply shearing the runner at the gate, shearing pin 18 serves to eject the runner. All of the ejection pins are mounted in an ejection plate 36. This includes shearing pin 18 as well as ejection pin 34. The ejection plate is positioned in the usual manner when the mold is closed so that the upper ends of the ejection pins and shearing pin terminate in the appropriate position. When the mold is open, the ejection plate moves the ejection pins and shearing pin forward simultaneously.

The second embodiment of the present invention is illustrated in FIG. 3. Herein are shown a number of possible modifications, any or all of which may be included in a mold design as desired. Sleeve 16' mounted in mold base 10' in hole 15' includes a sloped shoulder 28' as may be used in a drilled hole rather than a bored hole.

A cap plate 40 is solidly secured to and faces the rear side of the first base member to secure the sleeve in place.

Second base member 38' includes a runner channel 42 formed therein. The channel terminates over the open end of the sleeve, thereby allowing communication between the channel and the interior of the top end of the sleeve.

Shearing pin 18' is beveled on its upper surface 19' and thus has a leading edge adjacent the sleeve at the position of gate hole 22'. The gate is also preferably beveled at 24' leaving a pointed gate blade 26'. Thus, action of the shearing pin scissors the plastic in the gate between the sharpened shearing pin and the sharpened gate blade.

To accomodate the sideways movement of the runner in channel 14' as it is cut by sloping face 19', preferably a portion 43 of the mold base adjacent the runner is cut away, along with a section 20' of the sleeve. This allows the runner to pivot up and out as it is cut off.

Since shearing pin 18' is beveled, it must be kept from rotation. This is accomplished by providing a flat 44 on the rear end of the pin which mates in a similarly shaped hole in the ejection plate 36' to index the pin.

Now it may be appreciated that sleeve 16,16' may be made of very hard and durable material. Thus, only a thin gate blade is needed to have sufficient strength to withstand the stress of continuous action. However, should the gate blade break, it is simple to replace.

Note that this allows a very thin part to be gated in this manner. Parts less than $\frac{1}{4}$ inch thick, which it would be very difficult or impossible to sub-gate, are easily formed in cavities 12,12' and are provided with automatic runner removal according to the present invention.

Because of the simplicity of the design, the runner shearing assembly is easily retrofitted to existing dies. Thus, a die may be upgraded to full automation without extensive changing of die design (hot runners, etc.). And it is not adversely affected by contaminants, as are hot tip retrofits. It may be used to further advantage on an older die to replace worn or damaged gates rather than welding the die.

The assembly has the further advantage of increasing gate size. With conventional gating, part sink can often be controlled with a larger gate size. But the disadvantage is an unwieldly gate to trim. With the present device however, since the gate is automatically sheared, increasing gate size does not complicate part handling. Gate size can easily be increased by enlarging the hole opposite the beveled edge or on the sides.

I claim:

1. A runner shearing assembly for injection molding dies, the molding dies including first and second base members facing each other, said first and second base members having a closed position which provides a cavity therebetween wherein a plastic part is formed and also wherein is provided a runner channel for conveying molten plastic from a plastic source to the cavity, and having an open position wherein a solidified part and runner are ejected from said first and second base members, the runner shearing assembly comprising:

(a) a hollow cylindrical sleeve, made of a harder material than the first mold base, said sleeve being mounted in the first base member at a position such that an end wall of said sleeve is located adjacent the cavity, the sleeve having an opening communicating with the runner channel so that the molten plastic may pass into the end of the sleeve, and a gate hole through the wall of the sleeve adjacent the cavity for communicating between the interior of the end of the sleeve and the cavity; and (b) a shearing pin mounted in the first base member and being longitudinally slidable in the sleeve, and being positioned so that the molten plastic may flow through the gate hole when the first and second base members are in a closed position, and being operable to shear the plastic in the gate by sliding past the gate, separating the runner from the part when the base members are in an open position.

2. The assembly of claim 1 wherein the gate hole is beveled, leaving at a top edge of the sleeve a gate blade above the gate hole having a shearing edge adjacent which the shearing pin scissors.

3. The assembly of claim 1 wherein the runner channel is formed in the first base member and wherein a side of an end of the sleeve is cut away in a general shape of the runner channel.

4. The assembly of claim 1 wherein the runner channel is formed in the second base member and wherein the runner channel terminates over an open end of the sleeve.

5. The assembly of claim 1 wherein the sleeve has a shoulder thereon and is mounted in a similarly configured stepped hole in the first base member.

6. The assembly of claim 5 wherein the sleeve is secured in position by a hollow set screw, said hollow set screw being screwed against an end of the sleeve, the shearing pin extending through the set screw and into the sleeve.

7. The assembly of claim 5 wherein the sleeve is secured in position by a cap plate solidly secured to and facing a rear side of the first base member.

8. The assembly of claim 1 wherein the shearing pin is beveled and wherein a leading edge of said shearing pin slide past the gate hole.

9. The assembly of claim 8 wherein the gate hole is beveled, leaving at the top edge of the sleeve a gate blade above the gate hole having a shearing edge against which the shearing pin scissors.

10. The assembly of claim 8 wherein the runner channel and the opening in the sleeve adjacent the runner channel are cut out to allow free outward movement of the runner as said runner is sheared off.

11. The assembly of claim 8 wherein the shearing pin is indexed in the hole against rotation.

12. The assembly of claim 1 wherein the molding dies further include ejection pins slidable in the first base member to eject the solidified part and the runner, the ejection pins mounted on an ejection plate for simultaneous action to eject the solidified part and the runner, and wherein the shearing pin is mounted on the ejection plate for action therewith.

13. The assembly of claim 1 for use on a shallow part cavity, less than ¼ inch deep.

14. A runner shearing assembly for injecting molding dies, the molding dies including first and second base members facing each other, said first and second base members having a closed position which provides a cavity therebetween wherein a plastic part is formed and also wherein is provided a runner channel for conveying molten plastic from a plastic source to the cavity, and having an open position wherein a solidified part and runner are ejected from said first and second base members, the runner shearing assembly comprising:
(a) a gate blade made of a harder material than the first mold base said gate blade being mounted in the first base member adjacent the cavity at an end of the runner channel and having a hole therebelow forming a gate through which the molten plastic must pass; and
(b) a shearing pin mounted longitudinally slidably in the first base member adjacent the gate blade and operable to scissor against the gate blade to shear the plastic off at the gate, separating the runner from the part when the base members are in an open position.

15. The assembly of claim 14 wherein an upper edge of the gate hole is beveled providing a pointed gate blade adjacent the shearing pin.

16. The assembly of claim 14 wherein the shearing pin is beveled and wherein a leading edge of said shearing pin slides past the gate hole.

17. The assembly of claim 14 wherein an upper edge of the gate hole is beveled providing a pointed gate blade adjacent the shearing pin, and wherein the shearing pin is beveled and wherein a leading edge of said shearing pin slides the gate hole, scissoring the plastic at the gate.

18. A runner shearing assembly for injection molding dies, the injection molding dies including first and second base members facing each other, and having a closed position in which said first and second base members provide a cavity therebetween wherein a plastic part is formed and also wherein is provided a runner channel for conveying molten plastic from a plastic source to the cavity, and said first and second base members having an open position wherein the solidified part and runner are ejected from said first and second base members, the runner shearing assembly comprising:
(a) a replaceable hollow cylindrical sleeve insert, mounted in the first base member at a position such that an end wall of said sleeve is located adjacent the cavity, the sleeve having an opening communicating with the runner channel so that the molten plastic may pass into the end of the sleeve, and said sleeve further having a gate hole through the wall of the sleeve adjacent the cavity for communicating between the interior of the end of the sleeve and the cavity; and
(b) a shearing pin mounted in the first base member and being longitudinally slidable in the sleeve, and being positioned so that the molten plastic may flow through the gate hole when the mold members are in their closed position, and being operable to shear the plastic in the gate by sliding past the gate, separating the runner from the part when the base members are in their open position.

19. A runner shearing assembly for injection molding dies, the injection molding dies including first and second base members facing each other, and having a closed position in which said first and second base members provide a cavity therebetween wherein a plastic part is formed and also wherein is provided a runner channel for conveying molten plastic from a plastic source to the cavity, and said first and second base members having an open position wherein the solidified part and runner are ejected from said first and second base members, the runner shearing assembly comprising:
(a) a replaceable gate blade insert mounted in the first base member adjacent the cavity at an end of the runner channel, said replaceable gate blade insert having a hole therebelow forming a gate through which the molten plastic must pass; and
(b) a shearing pin mounted longitudinally slidably in the first base member adjacent the gate blade and operable to scissor against the gate blade to shear the plastic off at the gate, separating the runner from the part when the first and second base members are in an open position.

20. The assembly of claim 19 wherein an upper edge of the gate hole is beveled providing a pointed gate blade adjacent the shearing pin, and wherein the shearing pin is beveled and wherein a leading edge of the shearing pin slides past the gate hole, scissoring the plastic at the gate.

* * * * *